United States Patent
Kimmel

(10) Patent No.: US 9,489,293 B2
(45) Date of Patent: Nov. 8, 2016

(54) TECHNIQUES FOR OPPORTUNISTIC DATA STORAGE

(71) Applicant: NETAPP, INC., Sunnyvale, CA (US)

(72) Inventor: Jeffrey S. Kimmel, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 116 days.

(21) Appl. No.: 13/970,317

(22) Filed: Aug. 19, 2013

(65) Prior Publication Data

US 2014/0052946 A1 Feb. 20, 2014

Related U.S. Application Data

(60) Provisional application No. 61/684,215, filed on Aug. 17, 2012.

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 12/02* | (2006.01) | |
| *G06F 3/06* | (2006.01) | |

(52) U.S. Cl.
CPC ............ G06F 12/02 (2013.01); G06F 3/0608 (2013.01); G06F 3/0631 (2013.01); G06F 3/0679 (2013.01); *G06F 3/0641* (2013.01)

(58) Field of Classification Search
CPC ............... G06F 12/02; G06F 13/0608; G06F 13/0631; G06F 13/0641; G06F 13/0679
USPC .......................................... 711/159
See application file for complete search history.

(56) References Cited

U.S. PATENT DOCUMENTS

| | | | |
|---|---|---|---|
| 5,309,451 A * | 5/1994 | Noya et al. .................... 714/766 |
| 5,699,539 A * | 12/1997 | Garber .................. G06F 12/023 360/8 |
| 6,571,260 B1 * | 5/2003 | Morris ................ G06F 12/0253 |
| 7,076,611 B2 * | 7/2006 | Steere et al. ................... 711/133 |
| 7,783,836 B2 * | 8/2010 | Wang ............................. 711/133 |
| 8,880,806 B2 * | 11/2014 | Lightstone et al. .......... 711/133 |
| 8,954,393 B1 * | 2/2015 | Botes ............................ 707/651 |
| 2003/0110357 A1 * | 6/2003 | Nguyen et al. ............... 711/136 |
| 2005/0022201 A1 * | 1/2005 | Kaneda et al. ............... 718/104 |
| 2006/0143383 A1 * | 6/2006 | Zohar ................. G06F 12/0866 711/118 |
| 2007/0150691 A1 * | 6/2007 | Illendula ............. G06F 12/0246 711/170 |
| 2008/0148004 A1 * | 6/2008 | Iren et al. ...................... 711/170 |

(Continued)

*Primary Examiner* — Sheng-Jen Tsai
(74) *Attorney, Agent, or Firm* — Cesari and McKenna, LLP

(57) ABSTRACT

Techniques for opportunistic data storage are described. In one embodiment, for example, an apparatus may comprise a data storage device and a storage management module, and the storage management module may be operative to receive a request to store a set of data in the data storage device, the request indicating that the set of data is to be stored with opportunistic retention, the storage management module to select, based on allocation information, storage locations of the data storage device for opportunistic storage of the set of data and write the set of data to the selected storage locations. Other embodiments are described and claimed.

40 Claims, 8 Drawing Sheets

(56) References Cited

U.S. PATENT DOCUMENTS

| | | | |
|---|---|---|---|
| 2009/0100429 A1* | 4/2009 | Thoelke | G06F 12/1009 718/102 |
| 2009/0315903 A1* | 12/2009 | Ishikawa | H04N 1/00912 345/530 |
| 2010/0070733 A1* | 3/2010 | Ng | G06F 12/0246 711/171 |
| 2011/0145506 A1* | 6/2011 | Cherukuri et al. | 711/130 |
| 2011/0161298 A1* | 6/2011 | Grobman et al. | 707/649 |
| 2012/0159098 A1* | 6/2012 | Cheung | G06F 12/0261 711/162 |
| 2012/0198174 A1* | 8/2012 | Nellans et al. | 711/133 |
| 2012/0209893 A1* | 8/2012 | Kim | G06F 17/30129 707/822 |
| 2012/0222005 A1* | 8/2012 | Harris et al. | 717/120 |
| 2012/0300328 A1* | 11/2012 | Coker et al. | 360/31 |
| 2013/0191601 A1* | 7/2013 | Peterson et al. | 711/137 |

\* cited by examiner

FIG. 5

_Storage Medium 500_

*Computer Executable
Instructions for 200*

*700*

TECHNIQUES FOR OPPORTUNISTIC DATA STORAGE

RELATED CASE

This application claims priority to U.S. Provisional Patent Application No. 61/684,215, filed Aug. 17, 2012, the entirety of which is hereby incorporated by reference.

BACKGROUND

Data storage systems that implement an abstraction layer between physical storage resources and logical address space often reserve some physical capacity to improve input/output (I/O) efficiency for random write-intensive workloads. Such systems also often utilize storage reduction techniques such as compression, de-duplication, and/or copy-by-reference to lower the ratio of physical capacity used per unit of logical data stored. Implementing both a guaranteed retention level and an opportunistic retention level for data storage in such systems may enable previously reserved physical capacity to be used to store data that is opportunistically retained, and/or may allow physical space conserved via storage reduction techniques to be used to store more data.

BRIEF DESCRIPTION OF THE DRAWINGS

FIG. 5 illustrates an embodiment of a storage medium.

DETAILED DESCRIPTION

Various embodiments may be generally directed to techniques for opportunistic data storage. In one embodiment, for example, an apparatus may comprise a data storage device and a storage management module, and the storage management module may be operative to receive a request to store a set of data in the data storage device, the request indicating that the set of data is to be stored with opportunistic retention, the storage management module to determine, based on allocation information, storage locations of the data storage device for opportunistic storage of the set of data and write the set of data to the selected storage locations. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
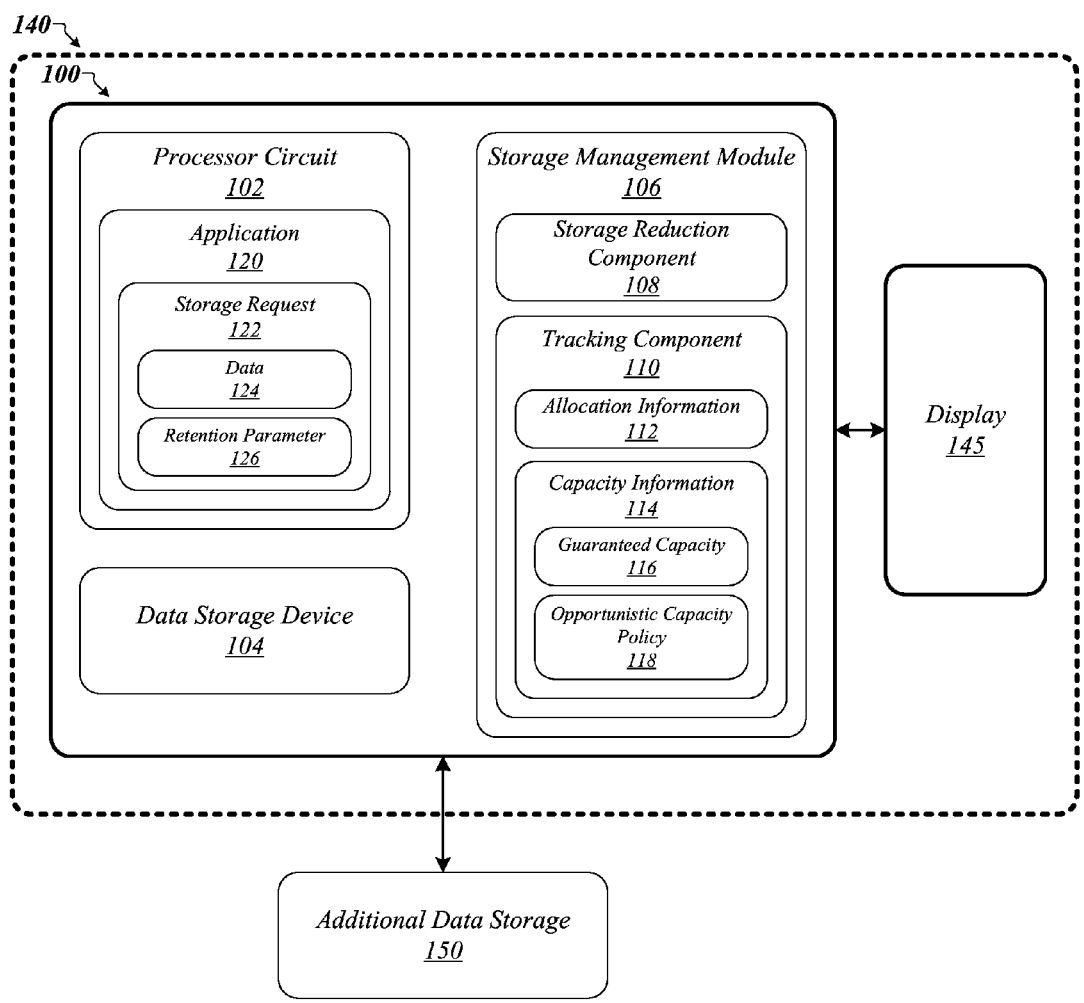
FIG. 1 illustrates one embodiment of an apparatus and one embodiment of a first system.

FIG. 1 illustrates a block diagram of an apparatus 100. As shown in FIG. 1, apparatus 100 comprises multiple elements including a processor circuit 102, a data storage device 104, and a storage management module 106. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise or be arranged to communicatively couple with a data storage device 104. Data storage device 104 may comprise any non-transitory computer-readable storage medium. Examples of data storage device 104 may include a solid-state drive (SSD) such as a flash drive, a hard disk drive (HDD), and any other type of non-transitory computer-readable storage medium. The embodiments are not limited in this context.

In various embodiments, apparatus 100 may comprise a storage management module 106. Storage management module 106 may comprise circuitry, logic, and/or instructions operative to manage the storage of data on data storage device 104. It is worthy of note that although processor circuit 102, data storage device 104, and storage management module 106 are external to each other and comprised within the single apparatus 100 in the example of FIG. 1, the embodiments are not so limited. For example, in some embodiments, an apparatus may comprise data storage device 104 and storage management module 106 but not processor circuit 102. In various such embodiments, the apparatus may be communicatively coupled to processor circuit 102. In another example, in some embodiments, storage management module 106 may comprise logic and/or circuitry contained within data storage device 104. In yet another example, in various embodiments, storage management module 106 may comprise storage management logic and/or instructions for execution by processor circuit 102, such as may be associated with a file system for an operating system executing on processor circuit 102. The embodiments are not limited in this context.

FIG. 1 also illustrates a block diagram of a system 140. System 140 may comprise any of the aforementioned elements of apparatus 100. System 140 may further comprise a display 145. Display 145 may comprise any display device capable of presenting visual effects based on data received from processor circuit 102 and/or stored in data storage device 104. Examples for display 145 may include a television, a monitor, a projector, and a computer screen. In one embodiment, for example, display 145 may be implemented by a liquid crystal display (LCD), light emitting diode (LED) or other type of suitable visual interface. Display 145 may comprise, for example, a touch-sensitive display screen ("touchscreen"). In various implementations, display 145 may comprise one or more thin-film transistors (TFT) LCD including embedded transistors. The embodiments, however, are not limited to these examples.

In some embodiments, apparatus 100 and/or system 140 may comprise or be communicatively coupled to additional data storage 150. In various embodiments, additional data storage may comprise one or more data storage devices usable by processor circuit 102 and/or storage management module 106 to store and/or retrieve data. In some embodiments, additional data storage 150 may comprise one or more data storage devices of a different type than data storage device 104. For example, in various embodiments, data storage device 104 may comprise a solid-state drive (SSD) and additional data storage 150 may comprise one or more hard disk drives (HDDs). It is to be understood, however, that the embodiments are not so limited. In some other embodiments, additional data storage 150 may comprise one or more data storage devices of a same type as data storage device 104. For example, in various embodiments, data storage device 104 may comprise an HDD and additional data storage 150 may also comprise an HDD. In yet other embodiments, some data storage devices among additional data storage 150 may be of a same type as data storage device 104, while other data storage devices among additional data storage 150 may be of a different type than data storage device 104. The embodiments are not limited in this context.

In general operation of apparatus 100 and/or system 140, storage management module 106 may be operative to manage the storage of data on data storage device 104. In various embodiments, storage management module 106 may be operative to implement multiple retention levels for data stored on data storage device 104. For example, in some embodiments, storage management module 106 may support semantics that enable the storage of some data with opportunistic retention and the storage of other data with guaranteed retention. Throughout this description, the term "opportunistic retention" as employed with respect to data storage refers to the storage of data in such fashion that the data occupies logical and/or physical address space that may subsequently be reallocated at the discretion of storage management module 106 and/or other circuitry, logic, and/or instructions, resulting in the loss and/or unavailability of the stored data. The term "guaranteed retention" as employed throughout with respect to data storage refers to the storage of data in such fashion that the data will remain available at its assigned logical and/or physical address space until it is rewritten, invalidated, or recharacterized for opportunistic retention.

When an application stores data with guaranteed retention, the stored data may generally remain intact and available to the application indefinitely, at the discretion of the application. For example, data stored with guaranteed retention may remain intact and available until the application overwrites the data, surrenders the storage locations holding the data, or recharacterizes the data for opportunistic retention. As such, the application may generally have control over the retention of the data. In contrast, when an application stores data with opportunistic retention, storage management module 106 may have control over the retention of the data, and may exercise its discretion to reallocate the storage space holding the data to another application or process. Thus, an application that stores data with opportunistic retention cannot count on the data remaining available indefinitely, but rather stores the data with the knowledge that it may only remain available for a limited period of time.

It is worthy of note that as employed herein in reference to storage locations and addresses, the term "physical" is not intended to strictly denote locations or addresses that directly comprise physical locations on a tangible storage medium. Although physical storage locations and/or addresses may directly comprise such physical locations in some embodiments, the embodiments are not so limited. In various embodiments, there may be one or more layers of indirection between what storage management module 106 regards as physical storage locations and/or addresses and the actual physical locations in data storage device 104 to which those physical storage locations and/or addresses correspond. The embodiments are not limited in this context.

In various embodiments, storage management module 106 may comprise a storage reduction component 108. Storage reduction component 108 may comprise logic, circuitry, and/or instructions operative to implement one or more storage reduction techniques to lower the ratio of physical capacity used per unit of logical data stored for data storage device 104. Examples of such storage reduction techniques may include compression, de-duplication, and copy-by reference ("cloning"). In some embodiments, each time storage management module 106 stores data on data storage device 104, storage reduction component 108 may analyze and/or process the data to attempt to apply one or more storage reduction techniques in conjunction with storage thereof. In various embodiments, in attempting to apply one or more storage reduction techniques, storage reduction component 108 may be operative to analyze and/or process the data before it is written, after it is written, or both. The embodiments are not limited in this context.

In some embodiments, storage management module 106 may comprise a tracking component 110. Tracking component 110 may comprise logic, circuitry, and/or instructions operative to assemble, manage, and/or update information describing data stored on data storage device 104. In various embodiments, tracking component 110 may be operative to assemble, manage, and/or update allocation information 112. Allocation information 112 may comprise information describing various properties of logical storage addresses associated with data storage device 104 and/or physical storage locations of data storage device 104. In some embodiments, allocation information 112 may comprise information indicating physical storage locations associated with various logical storage addresses associated with data storage device 104. In various embodiments, allocation information 112 may comprise information indicating whether data is currently stored in various logical storage addresses and/or physical storage locations of data storage device 104. In some embodiments, allocation information 112 may comprise information indicating, for any particular logical storage address and/or physical storage location of data storage device 104, whether guaranteed retention or opportunistic retention has been designated for that logical storage address and/or physical storage location. In various embodiments, allocation information 112 may comprise information indicating whether any logical storage addresses and/or physical storage locations of data storage device 104 have been reserved. For example, in some embodiments, allocation information 112 may comprise information indicating whether any logical storage addresses associated with data storage device 104 have been reserved by application executing on processor circuit 102.

In various embodiments, tracking component 110 may be operative to assemble, manage, and/or update capacity information 114. Capacity information 114 may comprise information pertaining to the capacity of data storage device 104 with respect to multiple data retention levels. In various embodiments, capacity information 114 may comprise guaranteed capacity 116. Guaranteed capacity 116 may comprise information indicating a size and/or amount of additional data that can be stored on data storage device 104 with guaranteed retention.

In some embodiments, capacity information 114 may comprise opportunistic capacity policy 118. Opportunistic capacity policy 118 may comprise criteria used by storage management module 106 to determine whether, when, and how to discard existing opportunistically stored data on data storage device 104 in order to free storage locations for opportunistic storage of new data on data storage device 104. For example, opportunistic capacity policy 118 may comprise information indicating if, when, and/or how storage management module 106 should consider and/or weigh performance costs, device endurance, recentness of data use, and/or other factors in determining whether to discard existing opportunistically stored data. In various embodiments, when it has identified a need to discard existing opportunistically stored data, storage management module 106 may use criteria of opportunistic capacity policy 118 to determine which existing opportunistically stored data to discard.

In various embodiments, opportunistic capacity policy 118 may comprise information indicating and/or useable to determine an order in which portions of existing opportunistically stored data on data storage device 104 should be discarded. For example, in some embodiments opportunistic capacity policy 118 may indicate that portions of existing opportunistically stored data should be discarded in order of their recentness of use, such that least recently used data is discarded first. In another example, opportunistic capacity policy 118 may indicate that portions of existing opportunistically stored data should be discarded in an order determined as a weighted function of how recently the portions have been used and the performance costs that will be associated with freeing and/or writing data to the storage locations occupied by those portions. It is to be understood that numerous algorithms and/or decision criteria could be implemented in opportunistically capacity policy 118 in various embodiments, and the embodiments are not limited in this context. In various embodiments, opportunistic capacity policy 118 may comprise information indicating one or more levels of granularity that storage management module 106 may utilize in discarding existing opportunistically stored data. Examples of such levels of granularity may include byte-level, fragment-level, block-level, block range-level, record-level, file-level, and object-level granularities. The embodiments are not limited to these examples.

In some embodiments, tracking component 110 may be operative to update allocation information 112 and/or capacity information 114 to reflect the storage of the data and the results of any storage reduction techniques applied by storage reduction component 108. In various embodiments, for example, tracking component 110 may be operative to update allocation information 112 to indicate the logical and physical addresses in which the data is stored after the completion of any applied storage reduction techniques, the retention level for the data and/or the logical storage addresses associated therewith, and/or whether an instruction has been received to reserve any particular amount and/or range of logical storage for the data. The embodiments are not limited in this context.

At any particular point in time during ongoing management of data storage device 104 by storage management module 106, some reserved logical storage addresses and/or physical storage locations of data storage device 104 may be unutilized by the applications and/or processes that reserve them, and thus may be available for opportunistic usage. For example, such reserved but unutilized logical storage addresses and/or physical storage locations may result from the application of storage reduction techniques. In a particular example, if a process reserves ten logical storage blocks and submits ten blocks of data for storage, and data compression is utilized to store that data in only eight physical storage blocks, the remaining two physical storage blocks may be available for opportunistic usage. By supporting opportunistic retention semantics in addition to guaranteed retention semantics, storage management module 106 may enable such conditions to be leveraged in order to increase the amount of logical data that can be stored per unit of physical capacity of data storage device 104. The embodiments are not limited in this context.

In some embodiments, processor circuit 102 may be operative to execute an application 120. Application 120 may comprise any computer-executable program, process, code, routine, function, and/or instruction set that has access to the logical storage addresses associated with the physical storage locations of data storage device 104. In various embodiments, application 120 may have indirect access to the logical storage addresses associated with data storage device 104 through a file system of an operating system executing on processor circuit 102. In some other embodiments, data storage device 104 may be directly exposed to application 120, and thus application 120 may have direct access to data storage device 104. The embodiments are not limited in this context.

In various embodiments, application 120 may be operative to generate a storage request 122. In some embodiments, storage request 122 may comprise logic, instructions, and/or commands operative to request storage of a set of data 124 in data storage device 104. In various embodiments, storage request 122 may comprise the data 124 to be stored. In some other embodiments, storage request 122 may not comprise data 124, but rather may comprise information identifying data 124, identifying a location of data 124, and/or identifying a message, instruction, command, and/or other logical construct that comprises the data 124. In various embodiments, storage request 122 may comprise a retention parameter 126. In some such embodiments, the retention parameter 126 may indicate a desired retention level for the data 124. In various embodiments, for example, retention parameter 126 may indicate whether data 124 is to be stored with guaranteed retention or with opportunistic retention. The embodiments are not limited in this context.

In various embodiments, storage request 122 may comprise a write command supported by extended drive semantics that enable the indication of a desired retention level in conjunction with a request to store data. In some embodiments, data storage device 104 and/or storage management module 106 may implement additional drive semantics in addition to those supporting the inclusion of retention parameter 126 in storage request 122. For example, in various embodiments, data storage device 104 and/or storage management module 106 may implement extended drive semantics that support alternate write commands capable of specifying desired data retention levels, but may also implement traditional drive semantics that support legacy write commands. Examples of traditional drive semantics may include small computer system interface (SCSI), advanced technology attachment (ATA), serial ATA (SATA), and non-volatile memory express (NVMe). Entities that do not support the extended drive semantics may be unable to use the alternate write commands, and thus may be unable to request opportunistic data storage. However, the implementation of traditional drive semantics may enable such entities to use the legacy write commands to obtain guaranteed data storage in the same manner as that in which they conventionally do so. The embodiments are not limited in this context.

In some embodiments, storage management module 106 may have control over the allocation of logical storage addresses for use by application 120. In such embodiments, storage request 122 may not indicate any particular logical storage addresses requested by application 120, but rather may comprise a request for allocation of logical storage addresses to application 120 at the discretion of storage management module 106. In various other embodiments, however, application 120 may have the ability to select particular logical storage addresses for its own use. In such embodiments, storage request 122 may indicate logical storage addresses that have been selected by application 120.

In some embodiments in which application 120 selects logical storage addresses using storage request 122, application 120 may explicitly indicate that the selected logical storage addresses should be classified as opportunistic storage using a retention parameter 126. In other embodiments, however, application 120 may implicitly indicate that it desires opportunistic storage via the particular logical storage addresses that it selects. In various embodiments, for example, application 120 may implicitly indicate a desire for opportunistic storage by selecting logical memory addresses that it knows to be associated with opportunistic storage.

In various embodiments, for example, application 120 may periodically receive portions of allocation information 112 from storage reduction component 106 that indicate the retention levels associated with various logical storage addresses, that indicate logical storage addresses that have been reclaimed for opportunistic storage, and/or that indicate logical storage addresses that are not currently reserved by other applications. In some embodiments, application 120 may periodically obtain such portions of allocation information 112 by polling and/or querying storage management module 106. In various other embodiments, storage management module 106 may periodically push such portions of allocation information 112 to application 120. In some embodiments, application 120 may implicitly indicate that it desires opportunistic storage by selecting logical storage addresses that it knows to be classified for opportunistic storage, based on received portions of allocation information 112. The embodiments are not limited to this example, however. In another example embodiment, some logical storage addresses may be statically designated for guaranteed storage and other logical storage addresses may be statically designated for opportunistic storage, and storage management module may implicitly indicate a desire for opportunistic storage by selecting logical memory addresses that it knows to be associated with opportunistic storage according to such static assignments. The embodiments are not limited in this context.

In various embodiments, once storage management module 106 receives storage request 122, it may be operative to determine whether storage request 122 comprises a request for guaranteed storage or a request for opportunistic storage. In some embodiments, storage management module 106 may make this determination based on a retention parameter 126 comprised in storage request 122. In other embodiments, storage management module 106 may make this determination based on whether logical memory addresses specified by storage request 122 are associated with guaranteed or opportunistic storage. In various embodiments, storage management module may determine that the storage request 122 is a request for guaranteed storage when it comprises a legacy write command associated with a traditional drive semantic that does not support opportunistic storage. The embodiments are not limited in this context.

In some embodiments, storage reduction component 108 may be operative to utilize one or more storage reduction techniques in order to lower the ratio of physical capacity used per unit of logical data stored for data storage device 104. In various such embodiments, once storage management module 106 receives storage request 122, storage reduction component 108 may be operative to perform one or more storage reduction operations. In some embodiments, storage reduction component 108 may perform one or more such storage reduction operations in order to determine an amount of storage space that will be used for storage of data 124 following the application of one or more storage reduction techniques. For example, storage reduction component 108 may compress data 124 and provide storage management module 106 with an indication of the amount of storage space that will be needed to store the compressed data 124. The embodiments are not limited to this example.

In various embodiments, when storage request 122 comprises a request for guaranteed storage, storage management module may be operative to determine whether data storage device 104 comprises sufficient available capacity for storing data 124 with guaranteed retention. For example, in some embodiments, storage management module 106 may be operative to compare a size of data 124 with guaranteed capacity 116. In some embodiments, the size of data 124 may comprise an amount of storage space needed to store data 124 after the application of one or more storage reduction techniques. In various embodiments, when storage request 122 comprises a request for guaranteed retention, storage management module 106 may be operative to determine that data storage device 104 does not comprise sufficient available capacity when storing data 124 will exceed guaranteed capacity 116, and may be operative to determine that data storage device 104 comprises sufficient available capacity when storing data 124 will not exceed guaranteed capacity 116.

In some embodiments, when storage request 122 comprises a request for guaranteed retention but data storage device 104 does not comprise sufficient available guaranteed capacity, storage management module 106 may be operative to deny storage request 122. In various other embodiments, when storage request 122 comprises a request for guaranteed retention but data storage device 104 does not comprise sufficient available guaranteed capacity, storage management module 106 may be operative to automatically handle storage request 122 as a request for opportunistic storage of part or all of data 124. In yet other embodiments, when storage request 122 comprises a request for guaranteed retention but data storage device 104 does not comprise sufficient available guaranteed capacity, storage management module may be operative to query application 120 for an instruction indicating whether to handle storage request 122 as a request for opportunistic storage of part or all of data 124. The embodiments are not limited in this context.

In various embodiments, storage management module 106 may be operative to determine whether there is a need to reclaim locations occupied by existing opportunistically stored data in order to accommodate storage request 122. For example, storage management module 106 may determine whether locations for storage of the set of data 124 at the desired retention level are available or may be made available without the need to reclaim locations occupied by existing opportunistically stored data. When it determines that there is a need to reclaim locations occupied by existing opportunistically stored data, storage management module 106 may be operative to select such locations to be reclaimed and discard the existing opportunistically stored data at those locations. In some embodiments, storage management module 106 may be operative to select locations to be reclaimed and/or opportunistic data to be discarded based on opportunistic capacity policy 118.

In various embodiments, storage management module 106 may be operative to select storage locations to be reclaimed and/or select existing opportunistically stored data to be discarded at a fine level of granularity, such as a byte-level, fragment-level, block-level, block range-level, record-level, file-level, and/or object-level granularity. In various embodiments, storage management module 106 may utilize levels of granularity specified in opportunistic capacity policy 118. In some embodiments, storage management module 106 may utilize a single level of granularity. For example, storage management module 106 may select storage locations to be reclaimed and/or select existing opportunistically stored data to be discarded on a block-by-block basis. In other embodiments, storage management module 106 may utilize multiple levels of granularity. For example, storage management module 106 may select some storage locations to be reclaimed and/or select some existing opportunistically stored data to be discarded using a block-level granularity, and may select other storage locations to be reclaimed and/or select other existing opportunistically stored data to be discarded using a file-level granularity. The embodiments are not limited to this example.

In some embodiments, storage management module 106 may be operative to discard existing opportunistically stored data at a fine level of granularity and in order of most recent use, discarding least recently used opportunistically stored data first, and proceeding from least recently used to most recently used until sufficient space has been created for the new data 124. The embodiments are not limited to this example, however. Storage management module 106 may utilize alternate and/or additional approaches as specified by opportunistic capacity policy 118 in order to create free space for opportunistic storage of data 124 in various other embodiments. In yet other embodiments, storage management module 106 may be operative to deny storage request 122 based on criteria specified in opportunistic capacity policy 118. The embodiments are not limited in this context.

It is worthy of note that in various embodiments, storage management module 106 may be operative to discard existing opportunistically stored data in order to accommodate a request for guaranteed storage. For example, if an application that has stored existing data with guaranteed retention overwrites that data with new data that cannot be compressed as much as the existing data, more physical storage may be required to accommodate the new data than was used to hold the existing data. Physical locations that were previously used for opportunistic storage may thus need to be reclaimed in order to accommodate the increased physical storage needs associated with guaranteed retention of the new data. The embodiments are not limited to this example.

In some embodiments, when/once data storage device 104 comprises sufficient available capacity for storing data 124 with the desired retention level, storage management module 106 may be operative to write data 124 to data storage device 104. In various embodiments, application 120 may have used storage request 122 to specify the logical addresses at which storage management module 106 is to store the data 124, and storage management module 106 may store the data 124 at the specified logical addresses. In other embodiments, storage management module 106 may be operative to select the logical addresses at which to store the data 124. In some such embodiments, when guaranteed retention is desired for data 124, storage management module 106 may be operative to determine logical and/or physical storage locations of data storage device 104 that are available and unreserved, and may store data 124 in such storage locations.

In various embodiments in which storage management module 106 is responsible for selecting the logical addresses for storage of data 124 and opportunistic retention is desired for data 124, storage management module 106 may be operative to determine logical and/or physical addresses of data storage device 104 that are designated for and/or well-suited for opportunistic storage. In some embodiments, storage management module 106 may determine such logical and/or physical addresses based on information in allocation information 112 identifying logical and/or physical storage addresses available for opportunistic storage. In various other embodiments, storage management module 106 may be operative to analyze allocation information 112 to determine reserved logical and/or physical addresses that are empty and/or contain discarded data. In some embodiments, storage management module 106 may be operative to prioritize such logical and/or physical addresses for use in opportunistic storage of data 124. In various embodiments, for example, storage management module 106 may be operative to store as much of data 124 as possible at logical and/or physical addresses that are designated for and/or well-suited for opportunistic storage, and to store any remaining portion of data 124 at other available storage locations. The embodiments are not limited in this context.

In some embodiments, once data 124 has been written to data storage device 104, tracking component 110 may be operative to update allocation information 112 and/or capacity information 114 to reflect the storage of the data 124. In various embodiments, for example, tracking component 110 may be operative to update allocation information 112 to indicate the logical and physical addresses in which the data 124 is stored after the completion of any applied storage reduction techniques, the retention level for the data 124 and/or the logical storage addresses associated therewith. In some embodiments, when the data 124 has been stored with guaranteed retention and an instruction has been received to reserve any particular amount and/or range of logical storage for the data 124 or a process associated therewith, tracking component 110 may be operative to update allocation information 112 to reserve that particular amount and/or range of logical storage addresses. The embodiments are not limited in this context.

The handling of data 124 subsequent to its storage in data storage device 104 may depend on the retention level for the data 124. In various embodiments, when data 124 is stored with guaranteed retention, storage management module 106 may be operative to preserve the data 124 at its assigned logical addresses until it is rewritten, invalidated, or recharacterized for opportunistic retention. In some embodiments, when data 124 is stored with opportunistic retention, storage management module 106 may be operative to preserve the data 124 only until some or all of its storage space is reclaimed, and/or until storage management module 106 determines that the data 124 should and/or must be discarded in order to accommodate a subsequent storage request. The embodiments are not limited in this context.

One advantage of various embodiments may be that storage management module 106 implements guaranteed and opportunistic retention semantics in such fashion as to enable opportunistic capacity use at fine granularity. Although some conventional systems implement automatic deletion of content when under capacity pressure, they typically do so at a coarse level of granularity, such as the automatic deletion of entire logical disk or file system images, for example. In contrast, the use tracking component 110 to assemble, manage, and/or update allocation 112 and capacity information 114 enables storage management module 106 to support opportunistic capacity use according to which automatic deletion is performed at a fine level of granularity, such as at byte-level, fragment-level, block-level, blockrange-level, record-level, file-level, and/or object-level granularity.

Another advantage of some embodiments may be that if data storage device 104 comprises a storage device exhibiting faster read times than additional data storage 150, opportunistic retention semantics may be utilized to employ data storage device 104 as a read-cache for data stored in additional data storage 150. Such read-caching may be performed adaptively, in order to leverage opportunistic storage when it is available on data storage device 104, without consuming guaranteed storage on data storage device 104 when opportunistic storage is not available. If particular data is stored in additional data storage 150 and also opportunistically stored on data storage device 104, the system may save time by retrieving that data from data storage device 104 rather than additional data storage 150. If the data is subsequently discarded at data storage device 104, it will still be available in additional data storage 150. As such, the system may realize performance gains by read-caching data when opportunistic storage is available at data storage device 104, while still ensuring that the data will be available in additional data storage 150. Other advantages are associated with various embodiments, and the embodiments are not limited in this context.

In some embodiments, storage management module 106 may support conversion between opportunistic retention and guaranteed retention for particular data stored in data storage device 104. For example, in various embodiments, data storage device 104 and/or storage management module 106 may implement extended drive semantics that support commands for conversion between opportunistic retention and guaranteed retention.

In some embodiments in which data 124 is stored with opportunistic retention, application 120 may subsequently be operative to send a command to storage management module 106 to convert data 124 to guaranteed retention. In various embodiments, storage management module 106 may convert data 124 from opportunistic to guaranteed retention by modifying allocation information to indicate that the logical storage addresses associated with the data 124 comprise guaranteed storage, and thus contain data that cannot be discarded in order to clear room for subsequent opportunistically stored data. Storage management module 106 may also modify guaranteed capacity 116 to reflect the conversion of the data 124 to guaranteed retention. Likewise, in some embodiments, storage management module 106 may convert data 124 from guaranteed to opportunistic retention by modifying allocation information to indicate that the logical storage addresses associated with the data 124 comprise opportunistic storage, and thus contain data that may be evaluated according to opportunistic capacity policy 118 for potential subsequent discard. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 2:
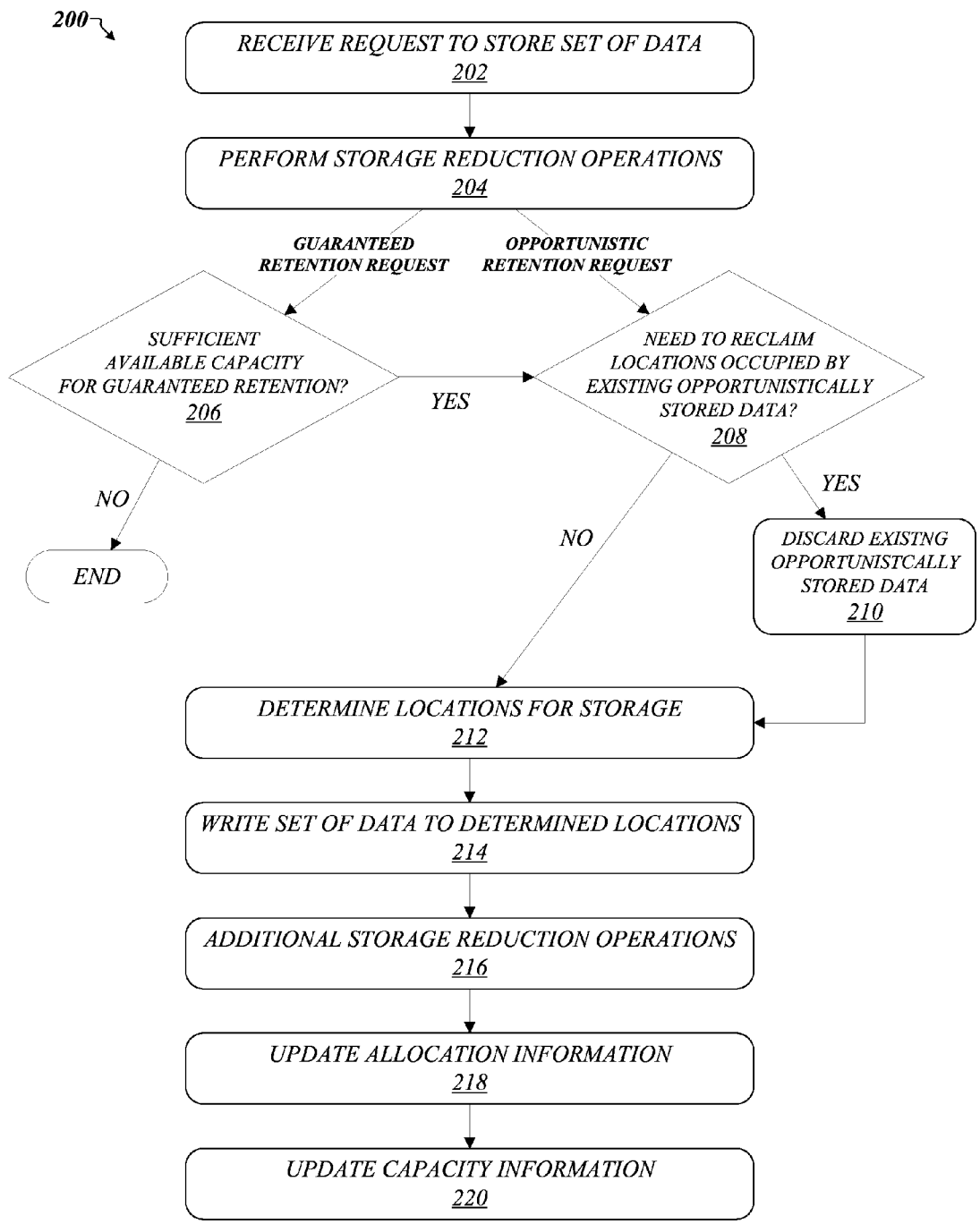
FIG. 2 illustrates one embodiment of a logic flow.

FIG. 2 illustrates one embodiment of a logic flow 200, which may be representative of the operations executed by one or more embodiments described herein. More particularly, logic flow 200 illustrates operations that may be performed by storage management module 106 of FIG. 1 in response to a storage request in various embodiments. As shown in logic flow 200, a request to store set of data may be received at 202. For example, storage management module 106 of FIG. 1 may receive a storage request 122 to store a set of data 124 with a retention level specified by retention parameter 126. At 204, one or more storage reduction operations may be performed in order to determine an amount of storage space that will used for storage of the set of data after application of one or more storage reduction techniques. For example, storage reduction component 108 of FIG. 1 may be operative to perform one or more storage reduction operations to determine an amount of storage space of data storage device 104 that will be used for storage of the set of data 124 after application of one or more storage reduction techniques.

From 204, flow may proceed to 206 if the storage request is a request for storage with guaranteed retention, and may proceed to 208 if the storage request is a request for storage with opportunistic retention. If the storage request is a request for storage with guaranteed retention, it may be determined at 206 whether there is sufficient available capacity for storage of the set of data with guaranteed retention. For example, storage management module 106 of FIG. 1 may determine whether storing the set of data 124 will exceed guaranteed capacity 116. If it is determined that there is not sufficient available guaranteed retention capacity to store the set of data, the logic flow may end. If it is determined that there is sufficient available guaranteed retention capacity to store the set of data, flow may then pass to 208.

At 208, it may be determined whether there is a need to reclaim locations occupied by existing opportunistically stored data in order to accommodate the storage request. For example, storage management module 106 of FIG. 1 may determine whether locations for storage of the set of data 124 may be made available without the need to reclaim locations occupied by existing opportunistically stored data. If it is determined that locations occupied by existing opportunistically stored data need to be reclaimed, flow may pass to 210. At 210, existing opportunistically stored data may be discarded in order to free locations for storage of the set of data. For example, storage management module 106 of FIG. 1 may select existing opportunistically stored data for discard that has been used least recently. If, at 208, it is determined that there is not a need to reclaim locations occupied by existing opportunistically stored data, flow may pass directly to 212. It is worthy of note that is some embodiments, the reclaiming of locations occupied by existing opportunistically stored data at 210 may comprise an asynchronous background activity, rather than an operation completed before flow passes to 212. As such, in various embodiments, flow may pass directly from 208 to 212 even if it is determined at 208 that there is a need to reclaim locations occupied by existing opportunistically stored data, and the reclaiming operations may be performed at a subsequent point in time.

At 212, storage locations for the set of data may be determined. For example, storage management module 106 of FIG. 1 may determine locations of data storage device 104 for storage of the set of data 124 based on allocation information 112. At 214, the set of data may be written to the determined storage locations. For example, storage management module 106 of FIG. 1 may write the set of data 124 to the locations of data storage device 104 that it has selected for storage of the set of data 124. At 216, one or more additional storage reduction operations may be performed. Such additional storage reduction operations may comprise storage reduction operations that can be performed more efficiently after the set of data is written at 214 that they can be performed during the storage reduction operations at 204. For example, if the information required for efficient utilization of a de-duplication technique is not available during the storage reduction operations at 204, then storage reduction operations for the de-duplication technique may instead be performed at 216. It is worthy of note that in some embodiments, there may be no storage reduction operations that are performed more efficiently after the set of data is written at 214, and thus all storage reduction operations may be performed at 204. In other embodiments, some storage reduction operations may be performed at 204 and other storage reduction operations may be performed at 216. In yet other embodiments, all storage reduction operations may be performed at 216. In still other embodiments, no storage reduction operations may be performed at either 204 or 216. The embodiments are not limited in this context.

At 218, the allocation information may be updated. For example, tracking component 110 of FIG. 1 may update allocation information 112 to indicate that the logical addresses associated with the set of data 124 comprise opportunistic storage. At 220, capacity information of the data storage device may be updated. For example, if the set of data 124 has been stored with guaranteed retention, storage management module 106 of FIG. 1 may update guaranteed capacity 116 to indicate a current amount of available guaranteed capacity. The embodiments are not limited to these examples.

Figure 3:
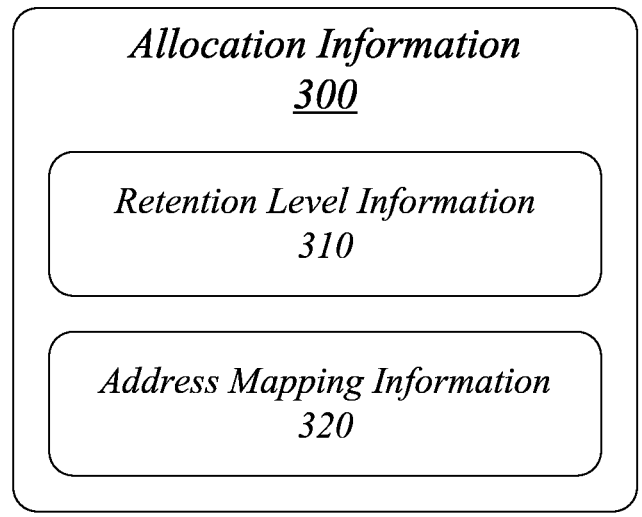
FIG. 3 illustrates one embodiment of allocation information.

FIG. 3 illustrates an embodiment of allocation information 300, such as may comprise an example of allocation information 112 of FIG. 1. As shown in FIG. 3, allocation information 300 comprises retention level information 310 and address mapping information 320. In various embodiments, retention level information 310 may comprise information indicating retention levels associated with logical storage addresses for a data storage device such as data storage device 104 of FIG. 1. In some embodiments, in order to convert particular data between guaranteed and opportunistic retention, retention level information 310 may be modified in order to change the retention level associated with the logical storage addresses of that data. For example, in order to convert data 124 from opportunistic to guaranteed retention, storage management module 106 of FIG. 1 may instruct tracking component 110 to modify retention level information within allocation information 112 to indicate that the logical storage addresses of data 124 are associated with guaranteed retention. The embodiments are not limited to this example.

In some embodiments, retention level information 310 may indicate retention levels for logical storage addresses according to one or more levels of granularity, such as byte-level, fragment-level, block-level, block range-level, record-level, file-level, and/or object-level granularity. In various embodiments, retention level information 310 may utilize a single level of granularity. For example, retention level information 310 may indicate retention levels for logical storage addresses on a block-by-block basis. In other embodiments, retention level information 310 may utilize multiple levels of granularity. For example, some of retention level information 310 may indicate retention levels for logical storage addresses with block-level granularity, while other retention level information 310 may indicate retention levels for logical storage addresses with file-level granularity. The embodiments are not limited to these examples.

Address mapping information 320 may comprise information indicating correspondences between logical storage addresses and physical storage addresses. For any particular logical storage address, mapping information 320 may comprise information indicating a physical storage address to which that logical storage address corresponds. In some embodiments, mapping information 320 may comprise an address table. In various embodiments, mapping information 320 may indicate and/or be usable to determine one or more logical storage addresses that are not reserved and are thus available for use by and/or assignment to an application requesting storage of data. The embodiments are not limited in this context.

Figure 4A:
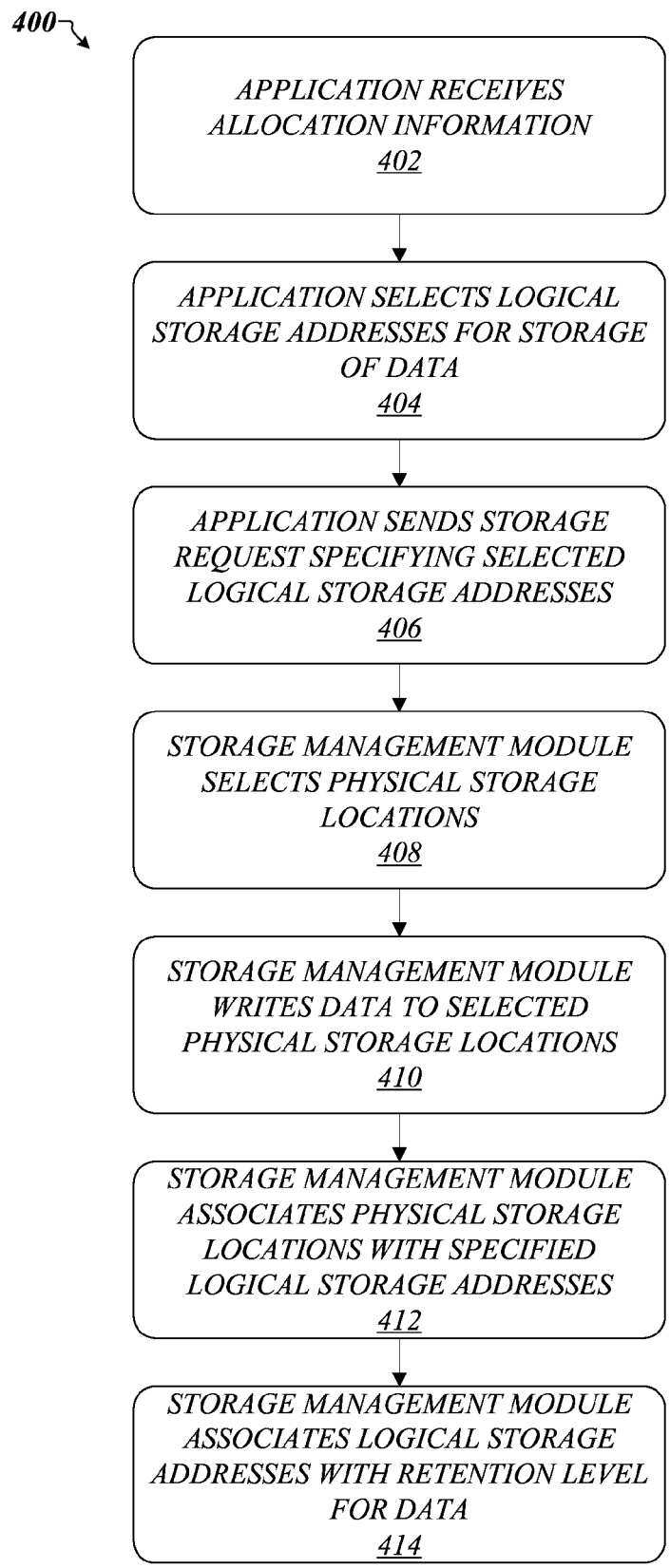
FIG. 4A illustrates one embodiment of a first operational flow.

FIG. 4A illustrates an embodiment of an operational flow 400. Operational flow 400 comprises an example of operations that may be performed by application 120 and storage management module 106 of FIG. 1 in various embodiments. More particularly, operational flow 400 comprises an example of operations that may be performed by application 120 and storage management module 106 of FIG. 1 in embodiments in which application 120 selects the logical storage addresses that are assigned to the data 124 one it is stored in data storage device 104. As shown in FIG. 4A, at 402, an application may receive allocation information. For example, application 120 of FIG. 1 may receive allocation information 112 from storage management module 106, in response to a poll or query for such information, or storage management module 106 may push the allocation information 112 to application 120. At 404, the application may select logical storage addresses for storage of data. For example, application 120 of FIG. 1 may select logical storage addresses that are assigned to the data 124 one it is stored in data storage device 104.

At 406, the application may send a storage request that specifies the logical storage addresses that it has selected. For example, application 120 of FIG. 1 may send a storage request 122 to storage management module 106, and the storage request 122 may specify logical storage addresses that application 120 has selected. In some embodiments, the storage request may implicitly specify the retention level desired for the data to be stored. For example, in order to implicitly specify opportunistic retention, the application may use the received allocation information to select logical storage addresses that are associated with opportunistic storage. In other embodiments, the storage request may explicitly specify the retention level desired for the data to be stored. For example, in addition to specifying the logical storage addresses that the application has selected, the storage request may include a retention parameter indicating the desired retention level for the data to be stored. The embodiments are not limited in this context.

At 408, the storage management module may select physical storage locations to which to write the data. For example, storage management module 106 of FIG. 1 may select physical storage locations of data storage device 104 to which to write data 124. In various embodiments, the storage management module may select the physical storage locations based on the desired retention level for the data. For example, if opportunistic retention is desired, the storage management module may use an opportunistic capacity policy to identify existing opportunistically stored data to be discarded, and may select physical storage locations occupied by the existing opportunistically stored data to be discarded. At 410, the storage management module may write the data to the selected physical storage locations. For example, storage management module 106 of FIG. 1 may write data 124 to physical storage locations in data storage device 104 that it has selected.

At 412, the storage management module may associate the physical storage locations to which it has written the data with the logical storage addresses specified in the storage request. For example, storage management module 106 of FIG. 1 may modify address mapping information 320 of FIG. 3 to indicate that the logical storage addresses specified in storage request 122 are associated with the physical storage locations of data storage device 104 to which it has written data 124. At 414, the storage management module may associate the logical storage addresses specified in the storage request with the retention level for the data. For example, storage management module 106 of FIG. 1 may modify retention level information 310 of FIG. 3 to indicate that the logical storage addresses specified in storage request 122 are associated with the retention level implicitly or explicitly indicated by the storage request 122. The embodiments are not limited to these examples.

Figure 4B:
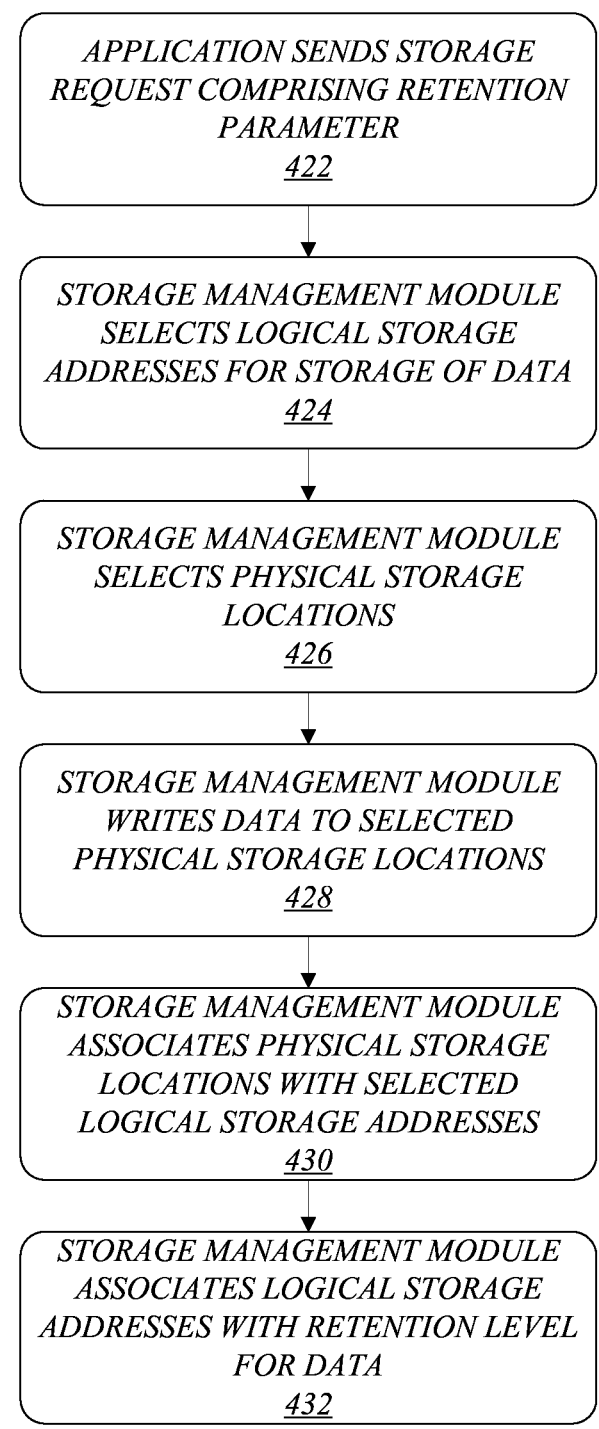
FIG. 4B illustrates one embodiment of a second operational flow.

FIG. 4B illustrates an embodiment of an operational flow 420. Operational flow 420 comprises an example of operations that may be performed by application 120 and storage management module 106 of FIG. 1 in various embodiments. More particularly, operational flow 420 comprises an example of operations that may be performed by application 120 and storage management module 106 of FIG. 1 in embodiments in which storage management module 106 selects the logical storage addresses that are assigned to the data 124 one it is stored in data storage device 104. As shown in FIG. 4B, at 422, an application may send a storage request comprising a retention parameter. For example, application 120 of FIG. 1 may send storage request 122 to storage management module 106, and storage request 122 may comprise retention parameter 126. At 424, the storage management module may select logical storage addresses for storage of the data. For example, storage management module 106 of FIG. 1 may select logical storage addresses for storage of data 124. In some embodiments, the storage management module may select logical storage addresses for storage of the data based on a retention level indicated by the retention parameter in the storage request.

At 426, the storage management module may select physical storage locations to which to write the data. For example, storage management module 106 of FIG. 1 may select physical storage locations of data storage device 104 to which to write data 124. In various embodiments, the storage management module may select the physical storage locations based on the desired retention level for the data. For example, if opportunistic retention is desired, the storage management module may use an opportunistic capacity policy to identify existing opportunistically stored data to be discarded, and may select physical storage locations occupied by the existing opportunistically stored data to be discarded. At 428, the storage management module may write the data to the selected physical storage locations. For example, storage management module 106 of FIG. 1 may write data 124 to physical storage locations of data storage device 104 that it has selected.

At 430, the storage management module may associate the physical storage locations to which it has written the data with the logical storage addresses that it has selected. For example, storage management module 106 of FIG. 1 may modify address mapping information 320 of FIG. 3 to indicate that the logical storage addresses that it has selected are associated with the physical storage locations of data storage device 104 to which it has written data 124. At 432, the storage management module may associate the logical storage addresses that it has selected with the retention level for the data. For example, storage management module 106 of FIG. 1 may modify retention level information 310 of FIG. 3 to indicate that the logical storage addresses that it has selected are associated with the retention level indicated by retention parameter 126. The embodiments are not limited to these examples.

FIG. 5 illustrates an embodiment of a storage medium 500. Storage medium 500 may comprise any non-transitory computer-readable storage medium or machine-readable storage medium, such as an optical, magnetic or semiconductor storage medium. In various embodiments, storage medium 500 may comprise an article of manufacture. In some embodiments, storage medium 500 may store computer-executable instructions, such as computer-executable instructions to implement logic flow 200 of FIG. 2. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 6:
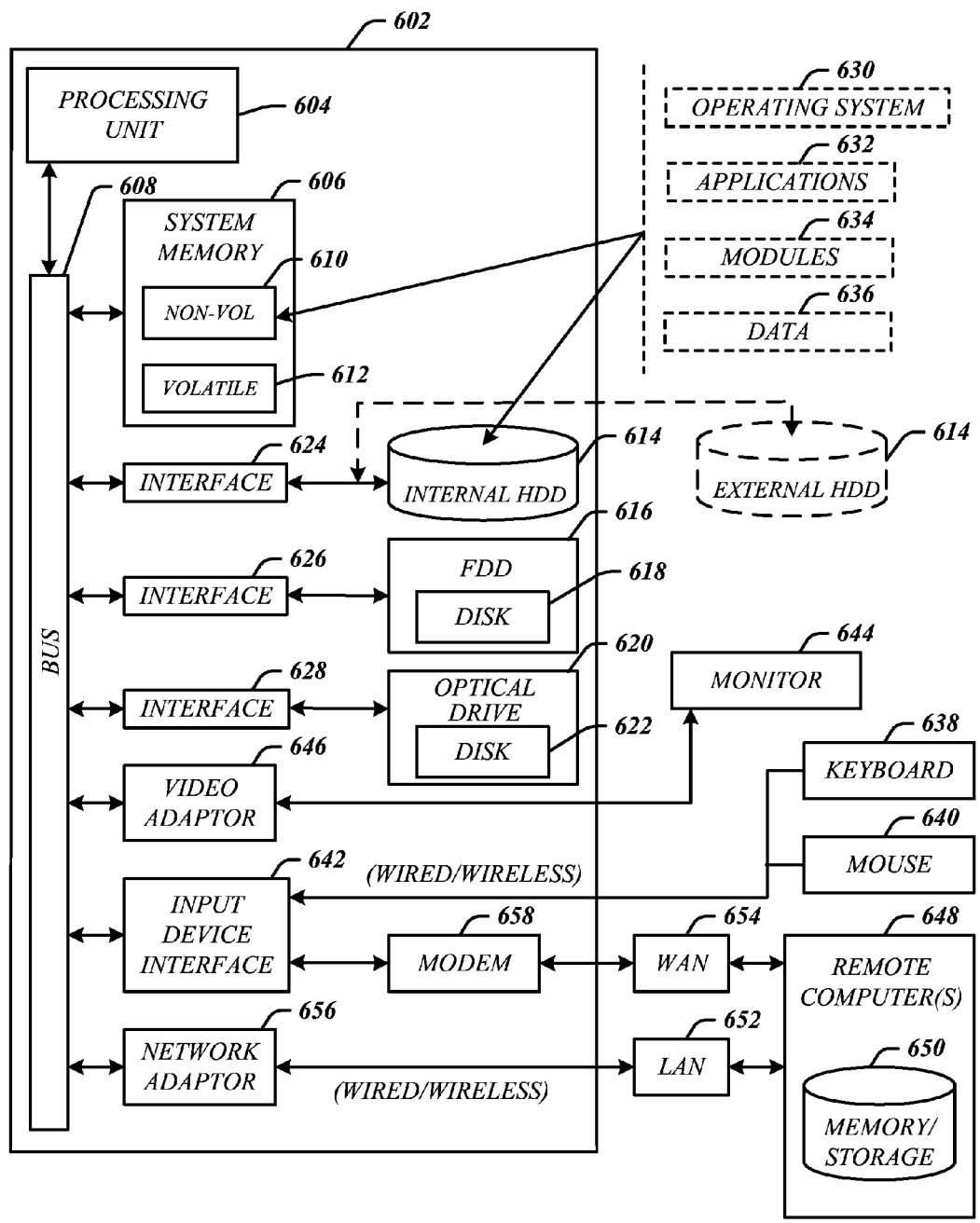
FIG. 6 illustrates an embodiment of a computing architecture.

FIG. 6 illustrates an embodiment of an exemplary computing architecture 600 suitable for implementing various embodiments as previously described. In various embodiments, the computing architecture 600 may comprise or be implemented as part of an electronic device. In some embodiments, the computing architecture 600 may be used, for example, to implement apparatus 100 and/or system 140 of FIG. 1, logic flow 200 of FIG. 2, and/or storage medium 500 of FIG. 5. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the apparatus 100.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
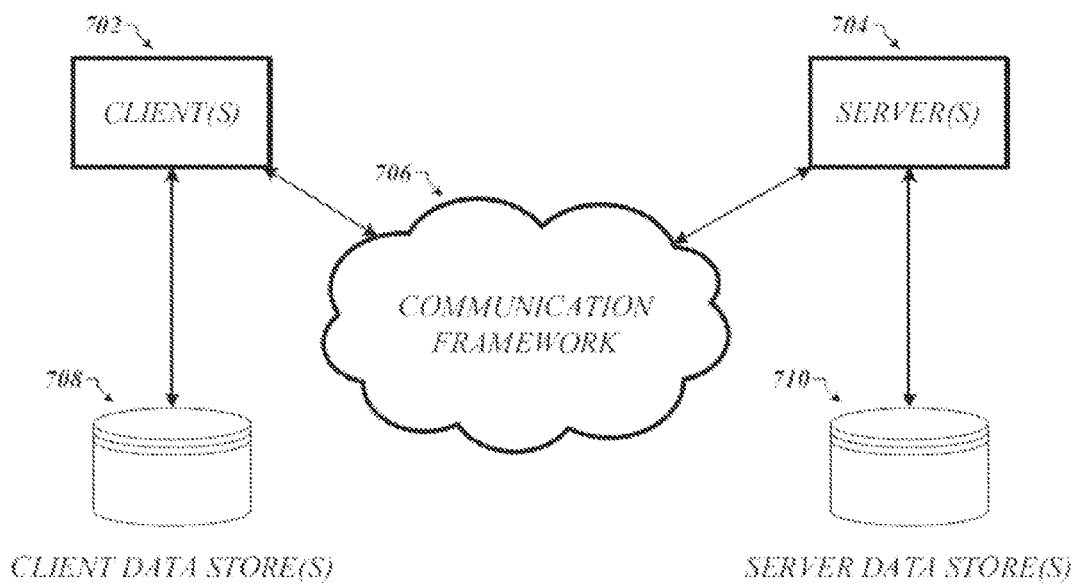
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. The clients 702 and the servers 704 are operatively connected to one or more respective client data stores 708 and server data stores 710 that can be employed to store information local to the respective clients 702 and servers 704, such as cookies and/or associated contextual information. Any one of clients 702 and/or servers 704 may implement apparatus 100 and/or system 140 of FIG. 1 and/or logic flow 200 of FIG. 2 in conjunction with storage of information on any of client data stores 708 and/or server data stores 710.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a data storage device having first storage space configured to store first data, the first data stored with opportunistic retention that is unavailable for access by an application when the first storage space is reallocated by a storage management module resulting in permanent loss of the first data;
the data storage device having second storage space configured to store second data, the second data stored with guaranteed retention that is available for access by the application until the application overwrites the second storage space; and
a processor coupled to a memory and configured to execute the application and the storage management module, the storage management module when executed operable to:

receive a request from the application to store first new data on the data storage device, determine that there is not an amount of free storage space on the data storage device to store the first new data, discard a first portion of the first data with the opportunistic retention stored at a selected storage location in the first storage space resulting in the permanent loss of the first portion of the first data, store the first new data at the selected storage location in the first storage space upon discarding the first portion of the first data, and convert the selected storage location in the first storage space that stores the first new data from the opportunistic retention to the guaranteed retention such that the first new data stored in the converted selected storage location cannot be discarded to store subsequent opportunistic data.

2. The apparatus of claim 1, wherein the storage management module is further operable to update allocation information to indicate that the selected storage location stores the first new data.

3. The apparatus of claim 1, wherein the storage management module is further operable to discard the first portion of the first data utilizing an opportunistic capacity policy that considers a weighting for at least one of a performance cost, a device endurance, and a recentness of data use.

4. The apparatus of claim 1, wherein the storage management module is further operable to discard the first portion of the first data with the opportunistic retention using a block-level granularity.

5. The apparatus of claim 1, wherein the storage management module is further operable to discard the first portion of the first data with the opportunistic retention using a byte-level granularity.

6. The apparatus of claim 1, wherein the storage management module is further operable to discard the first portion of the first data with the opportunistic retention using a record-level granularity.

7. The apparatus of claim 1, wherein the storage management module is further operable to discard the first portion of the first data with the opportunistic retention using an object-level granularity.

8. The apparatus of claim 1, wherein the first portion of the first data with the opportunistic retention is least recently used data.

9. The apparatus of claim 1, wherein the storage management module is further operable to perform at least one storage reduction operation to reduce an amount of storage space required to store the first new data.

10. The apparatus of claim 9, wherein the at least one storage reduction operation includes at least one of data compression, data de-duplication, and copy-by-reference.

11. The apparatus of claim 1, wherein the storage management module is further operable to convert the selected storage location storing the first new data from the guaranteed retention back to the opportunistic retention.

12. The apparatus of claim 1, wherein the selected storage location includes logical block addresses (LBAs) associated with physical storage locations on the data storage device.

13. The apparatus of claim 1, wherein the storage management module is further operable to:

receive a second request to store second new data on the data storage device, the second new data to be stored with the guaranteed retention; and write the second new data to at least one other storage location on the data storage device designated for the guaranteed retention.

14. The apparatus of claim 1, further comprising a display screen coupled to the processor of the apparatus, the display screen operable to present visual effects based on storage of the first new data on the data storage device.

15. A method, comprising:

storing first data in first storage space of a data storage device, the first data stored with opportunistic retention that is unavailable for access by an application when the first storage space is reallocated by a processor resulting in permanent loss of the first data;

storing second data in second storage space of the data storage device, the second data stored with guaranteed retention such that the second data is available for access by the application until the application overwrites the second storage space;

receiving, from the application executed by the processor, a request to store first new data on the data storage device, the request indicating that the first new data to be stored with the opportunistic retention;

discarding, by the processor, a first portion of the first data with the opportunistic retention stored at a selected storage location in the first storage space resulting in permanent loss of the first portion of the first data, based on an opportunistic capacity policy that includes a weighted function;

writing the first new data to the selected storage location in the first storage space upon discarding the first portion of the first data; and converting the selected storage location in the first storage space that stores the first new data from the opportunistic retention to the guaranteed retention such that the first new data stored in the converted selected storage location cannot be discarded to store subsequent opportunistic data.

16. The method of claim 15, further comprising updating allocation information to indicate that the storage location stores the first new of data.

17. The method of claim 15, wherein the opportunistic capacity policy considers a weighting for at least one of a performance cost, a device endurance, and a recentness of data use for discarding the first portion of the first data.

18. The method of claim 17, further comprising discarding the first portion of the first data with opportunistic retention using a block-level granularity.

19. The method of claim 17, further comprising discarding the first portion of the first data with opportunistic retention using a byte-level granularity.

20. The method of claim 17, further comprising discarding the first portion of the first data with opportunistic retention using a record-level granularity.

21. The method of claim 17, further comprising discarding the first portion of the first data with opportunistic retention using an object-level granularity.

22. The method of claim 17, wherein the first portion of the first data with opportunistic retention is least recently used data.

23. The method of claim 17, further comprising determining that the first portion of the first data is to be discarded based on insufficient free space on the storage device to store the first new data.

24. The method of claim 15, comprising performing at least one storage reduction operation to reduce an amount of storage space required for storing the first new of data.

25. The method of claim 24, wherein the at least one storage reduction operation includes at least one of data compression, data de-duplication, and copy-by-reference.

26. The method of claim 15, wherein converting the selected storage location further comprises converting the selected storage location storing the first new data from the guaranteed retention back to the opportunistic retention.

27. The method of claim 15, wherein the selected storage location includes logical block addresses (LBAs) associated with physical storage locations in the data storage device.

28. The method of claim 15, further comprising:
receiving a second request to store second new data, the request indicating that the second new data is to be stored with the guaranteed retention;
determining a guaranteed capacity value indicating an available capacity of the data storage device for guaranteed storage; and
when a size of the second new data is less than or equal to the guaranteed capacity value, writing the second new data to at least one other storage location of the data storage device designated for the guaranteed storage.

29. A non-transitory computer readable storage medium containing executable program instructions to be executed by a processor and further configured to be stored on the computer readable storage medium, the executable program instructions that:
receive a request, from an application, to store new data on a data storage device, the request indicating that the new data is to be stored with opportunistic retention that is unavailable to access by the application when first storage space of the data storage device storing the opportunistic retention data is reallocated by a module resulting in permanent loss of the opportunistic data, and wherein guaranteed retention data is available for access by the application until the application overwrites second storage space storing the guaranteed retention data;
select, based on allocation information, a storage location of the first storage space storing the opportunistic retention data;
discard a portion of the opportunistic retention data stored at the selected storage location based on an opportunistic capacity policy and resulting in the permanent loss of the portion of the opportunistic retention data;
write the new data to the selected storage location upon discarding the portion of the opportunistic retention data; and
convert the selected storage location in the first storage space that stores the first new data from the opportunistic retention to the guaranteed retention such that the first new data stored in the converted selected storage location cannot be discarded to store subsequent opportunistic data.

30. The non-transitory computer readable medium of claim 29, wherein the executable program instructions, executed by the processor, further comprise program instructions that update the allocation information to indicate that the selected storage location stores the new data.

31. The non-transitory computer readable medium of claim 29, wherein the opportunistic capacity policy considers a weighting for at least one of a performance cost, a device endurance, and a recentness of data use for the opportunistic retention data.

32. The non-transitory computer readable medium of claim 31, wherein the portion of the opportunistic retention data is discarded using a block-level granularity.

33. The non-transitory computer readable medium of claim 31, wherein the portion of the opportunistic retention data is discarded using a byte-level granularity.

34. The non-transitory computer readable medium of claim 31, wherein the portion of the opportunistic retention data is discarded using a record-level granularity.

35. The non-transitory computer readable medium of claim 31, wherein the portion of the opportunistic retention data is discarded using an object-level granularity.

36. The non-transitory computer readable medium of claim 31, wherein the portion of the opportunistic retention data is least recently used data.

37. The non-transitory computer readable medium of claim 29, wherein the executable program instructions, executed by the processor, further comprise program instructions that perform at least one storage reduction operation to reduce an amount of storage space required to store the new data.

38. The non-transitory computer readable medium of claim 37, wherein the at least one storage reduction operation includes at least one of data compression, data de-duplication, and copy-by-reference.

39. The non-transitory computer readable medium of claim 29, wherein the executable program instructions, executed by the processor, further comprise program instructions that convert the selected storage location that stores the first new data from guaranteed retention back to opportunistic retention.

40. The non-transitory computer readable medium of claim 29, wherein the selected storage location includes logical block addresses (LBAs) associated with physical storage locations on the data storage device.

* * * * *